(12) United States Patent
Kakuta et al.

(10) Patent No.: US 9,018,528 B2
(45) Date of Patent: Apr. 28, 2015

(54) METHOD FOR PRODUCING WIRING HARNESS, AND WIRING HARNESS

(75) Inventors: Tatsuya Kakuta, Yokkaichi (JP); Takehiro Hosokawa, Yokkaichi (JP); Kazuyuki Sohma, Yokohama (JP); Tomoyuki Hattori, Yokohama (JP)

(73) Assignees: Autonetworks Technologies, Ltd., Mie (JP); Sumitomo Wiring Sytems, Ltd., Mie; Sumitomo Electric Industries, Ltd., Osaka (JP)

( * ) Notice: Subject to any disclaimer, the term of this patent is extended or adjusted under 35 U.S.C. 154(b) by 61 days.

(21) Appl. No.: 13/504,359

(22) PCT Filed: Nov. 19, 2010

(86) PCT No.: PCT/JP2010/070729
§ 371 (c)(1),
(2), (4) Date: Jun. 11, 2012

(87) PCT Pub. No.: WO2011/065311
PCT Pub. Date: Jun. 3, 2011

(65) Prior Publication Data
US 2012/0247828 A1     Oct. 4, 2012

(30) Foreign Application Priority Data
Nov. 25, 2009    (JP) .................................. 2009-267021

(51) Int. Cl.
*H01B 7/00*     (2006.01)
*H02G 3/04*     (2006.01)
(Continued)

(52) U.S. Cl.
CPC .................. *H01R 4/22* (2013.01); *H01B 7/282* (2013.01); *H01R 4/72* (2013.01); *B29C 35/0805* (2013.01); *B29C 2035/0827* (2013.01)

(58) Field of Classification Search
USPC .......................................................... 427/512
See application file for complete search history.

(56) References Cited

U.S. PATENT DOCUMENTS 4,822,434 A     4/1989    Sawaki et al.
6,362,249 B2 *   3/2002    Chawla ........................ 522/182
(Continued)

FOREIGN PATENT DOCUMENTS

CN     1886437 A     12/2006
CN     1914771 A   *   2/2007
(Continued)

OTHER PUBLICATIONS

Jan. 21, 2014 Office Action issued in Japanese Patent Application No. 2009-267021 (with English Translation).
(Continued)

*Primary Examiner* — Dah-Wei D Yuan
*Assistant Examiner* — Kristen A Dagenais
(74) *Attorney, Agent, or Firm* — Oliff PLC

(57) ABSTRACT

Provided is a method for producing a wiring harness including a sealing member having higher airtightness, the method including a coat formation step of forming a coat of a composition solution by providing the composition solution that contains at least a photo polymerization initiator, a thermal radical polymerization initiator, and a polymerizable compound to an exposed bunched portion and a coated bunched portion that is adjacent to the exposed bunched portion of the bunch of electric wires, and a curing step of irradiating the coat formed on the exposed bunched portion and the adjacent coated bunched portion with light to photocure the coat and to thermally cure the coat by heat of the photocure and heat of collected light.

8 Claims, 7 Drawing Sheets

(51) Int. Cl.
*A23L 3/16* (2006.01)
*H01R 4/22* (2006.01)
*H01B 7/282* (2006.01)
*H01R 4/72* (2006.01)
*B29C 35/08* (2006.01)

(56) References Cited

U.S. PATENT DOCUMENTS

| | | | |
|---|---|---|---|
| 2008/0283268 A1 | 11/2008 | Iwasaki et al. | |
| 2010/0084574 A1* | 4/2010 | Brassell et al. | 250/492.1 |

FOREIGN PATENT DOCUMENTS

| | | |
|---|---|---|
| CN | 101248558 A | 8/2008 |
| JP | A-8-291152 | 11/1996 |
| JP | A-09-035540 | 2/1997 |
| JP | A-2005-347167 | 12/2005 |
| JP | A-2007-317470 | 12/2007 |
| JP | A-2008-123712 | 5/2008 |
| JP | 2009-79204 | 4/2009 |
| JP | A-2009-099451 | 5/2009 |
| JP | A-2009-130981 | 6/2009 |
| JP | A-2009-205947 | 9/2009 |
| JP | A-2010-231978 | 10/2010 |
| JP | A-2011-113692 | 6/2011 |
| JP | A-2011-113693 | 6/2011 |
| WO | WO 2007/013589 A1 | 2/2007 |

OTHER PUBLICATIONS

Feb. 8, 2011 International Search Report issued in International Patent Application No. PCT/JP2010/070729.
Jun. 5, 2013 Chinese Office Action issued in Chinese Patent Application No. 201080053504.X (with translation).
Mar. 6, 2013 Chinese Search Report issued in Chinese Patent Application No. 201080053504.X (with translation).
Nov. 27, 2014 European Search Report issued in European Patent Application No. 10833157.0.

* cited by examiner

METHOD FOR PRODUCING WIRING HARNESS, AND WIRING HARNESS

TECHNICAL FIELD

The present invention relates to a method for producing a wiring harness in which a splice is sealed with a resin in order to prevent water immersion, and relates to a wiring harness produced in the method.

BACKGROUND ART

Conventionally, wiring harnesses are used for wiring in an automobile. Each of these wiring harnesses is made up of a bunch of electric wires including conductors that are coated with insulations, and includes a splice that is arranged to electrically connect the electric wires. The splice is formed by connecting the conductors by welding, soldering or crimping, which are exposed by peeling the insulations of the electric wires.

An exposed portion of the conductors that includes the splice is vulnerable to corrosion due to electrical leakage or contact of water if left as it is. For this reason, a sealing member that is made from a resin is formed on the splice in order to prevent electrical leakage and water immersion.

The conductors are bunched having narrow spaces left among them at a spot of their exposed portion excluding the splice. Thus, in forming the sealing member, the spaces also need to be filled with the resin in a convincing way.

The sealing member needs to be provided to the exposed portion of the conductors that includes the splice and also to an end portion of the bunch of the electric wires coated with the insulations that are adjacent to the exposed portion and the splice. The spaces are provided in a longitudinal direction among the electric wires, so that the sealing member needs to be provided so as to fill the spaces. If the spaces are not filled with the sealing member, water that comes in from the other end of the bunch of the electric wires could reach the splice through the spaces.

This kind of wiring harnesses are sometimes used for wiring in a site that is susceptible to water such as an engine room. In this case, the sealing members are required to be capable of filling these spaces among the electric wires in a convincing way.

PTL 1 discloses a technique for sealing a splice of a wiring harness with a thermal curing resin such as an epoxy resin. The thermal curing resin of PTL 1 is heated within a temperature span such that thermal cure develops relatively slowly, which can curb a sharp rise in viscosity caused by thermal cure. The technique disclosed in PTL 1 is capable of sufficiently filling spaces among bunched electric wires, and narrow spaces among exposed bunched conductors.

PTL 2 discloses a technique for sealing a splice of a wiring harness with a photocuring resin. In PTL 2, the splice of the wiring harness is immersed in a solution of the photocuring resin, is then picked up therefrom, and cured by irradiating the photocuring resin solution provided to the splice with light (ultraviolet light).

CITATION LIST

Patent Literature

PTL 1: JP2007-317470A
PTL 2: JP2005-347167A

SUMMARY OF INVENTION

Technical Problem

However, in the technique disclosed in PTL 1, there arises a problem that the thermal curing resin needs to be prepared by properly mixing two kinds of solutions consisting of a base compound and a curing agent, so that facilities that allow measuring, filing and application of the solutions with precision need to be prepared, which causes an increase in cost.

Using the photocuring resin as a sealing member, which is the technique disclosed in PTL 2, can reduce the curing time to a great extent depending on conditions (e.g. the curing time can be reduced to a few seconds). However, there arises a problem that the technique disclosed in PTL 2 is not capable of sealing spaces among bunched electric wires, or spaces among exposed bunched conductors in a convincing way. This is because the light to cure the photocuring resin cannot reach these spaces, and accordingly cannot sufficiently cure the photocuring resin in these spaces. Therefore, the technique disclosed in PTL 2 is not capable of forming a sealing member with which the spaces are sufficiently filled.

In addition, it is required these days to form a sealing member that has higher airtightness. To be specific, it is required to provide a sealing member with which even narrow spaces, which exist between conductors (strands) and insulations of electric wires, and are not seen as a problem conventionally, can be filled. It is also required to provide a technique for forming a sealing member, with which even these narrow spaces can be filled, on a splice in a short period of time.

Solution to Problem

In order to solve the problems described above, a method for producing a wiring harness of the present invention, wherein the wiring harness includes a bunch of electric wires including a plurality of insulated electric wires, each of which includes a conductor, and an insulation with which a portion of the conductor is coated while the other portion is exposed, the bunch of electric wires including an exposed bunched portion including a splice, the exposed bunched portion defining a spot at which the exposed portions of the conductors of the insulated electric wires are bunched and connected to each other, and a coated bunched portion that defines a spot at which the coated portions of the conductors of the insulated electric wires are bunched, and a sealing member arranged to seal the exposed bunched portion and an end portion of the coated bunched portion that is adjacent to the exposed bunched portion, includes a coat formation step of forming a coat of a composition solution by providing the composition solution containing at least a photo polymerization initiator, a thermal radical polymerization initiator, and a polymerizable compound to the exposed bunched portion and the adjacent coated bunched portion, and a curing step of irradiating the coat formed on the exposed bunched portion and the adjacent coated bunched portion with light to photocure the coat and to thermally cure the coat by heat of the photocure and heat of collected light.

It is preferable that in the coat formation step, the composition solution is put in a transparent container, and the bunch of electric wires is placed in the composition solution in the container from an upper surface of the composition solution until the exposed bunched portion and the end portion of the adjacent coated bunched portion are immersed in the composition solution to form the coat on the exposed bunched portion and the end portion of the adjacent coated bunched portion, and in the curing step, the coat is irradiated with the light from the outside of the container.

Alternatively, it is preferable that in the coat formation step, the bunch of electric wires is placed in a transparent mold, and the composition solution is put in the mold to form the coat on the exposed bunched portion and the end portion of the adjacent coated bunched portion, and in the light irradiation step, the coat is irradiated with the light from the outside of the mold.

It is preferable that the light irradiation step is performed under an inert gas atmosphere.

It is preferable that the composition solution has a viscosity of 1000 mP·s or less.

It is preferable that the polymerizable compound contains a urethane acrylate oligomer, a chain acrylate monomer, and either one or both of a cyclic N-vinyl monomer and a cyclic acrylate monomer.

In another aspect of the present invention, a wiring harness of the present invention includes a bunch of electric wires including a plurality of insulated electric wires, each of which includes a conductor and an insulation with which a portion of the conductor is coated while the other portion is exposed, the bunch of electric wires including an exposed bunched portion including a splice, the exposed bunched portion defining a spot at which the exposed portions of the conductors of the insulated electric wires are bunched and connected to each other, and a coated bunched portion that defines a spot at which the coated portions of the conductors of the insulated electric wires are bunched, and a sealing member arranged to seal the exposed bunched portion and an end portion of the coated bunched portion that is adjacent to the exposed bunched portion, wherein the sealing member includes a resin that is photocured and thermally cured.

It is preferable that the resin of the sealing member includes a cured object of a composition solution containing a photo polymerization initiator, a thermal radical polymerization initiator, and a polymerizable compound.

It is preferable that the polymerizable compound contains a urethane acrylate oligomer, a chain acrylate monomer, and either one or both of a cyclic N-vinyl monomer and a cyclic acrylate monomer.

It is preferable that the sealing member has an adhesion property of 100 N/m or more.

It is preferable that the sealing member has a degree of cure of 90% more.

Advantageous Effects of Invention

According to the method for producing the wiring harness of the present invention, a spot in a sealing member that light does not reach and accordingly cannot be photocured can be thermally cured by heat of collected light, the sealing member arranged to seal an exposed bunched portion that includes a splice defining a spot at which exposed conductors of insulated electric wires of a bunch of electric wires are bunched, and a coated bunched portion of the insulated electric wires that is coated with an insulation. Thus, the wiring harness that includes the sealing member having higher airtightness can be provided.

Having higher airtightness, the wiring harness of the present invention has especially excellent water resistance.

DESCRIPTION OF EMBODIMENTS

A detailed description of a method for producing a wiring harness of a first preferred embodiment of the present invention will now be provided with reference to the accompanying drawings.

[Method for Producing Wiring Harness]

In the method for producing the wiring harness of the present embodiment, the wiring harness is produced by forming a sealing member on a bunch of electric wires. First, a description of the bunch of electric wires on which the sealing member is formed is provided.

Figure 1:
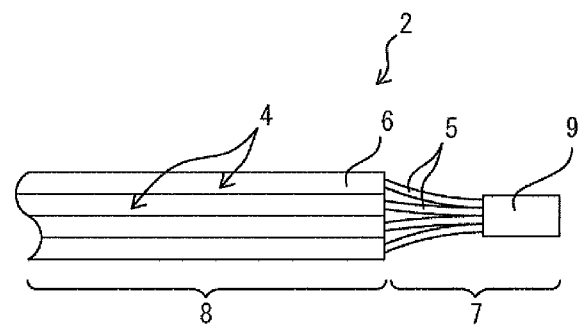
FIG. 1 is a view showing a schematic configuration of a bunch of electric wires including a splice at its end.

FIG. 1 is a view showing a schematic configuration of a bunch of electric wires. A bunch of electric wires 2 consists of a bunch of insulated electric wires 4 as shown in FIG. 1. Known electric wires can be used as the electric wires 4 as appropriate. Each of the insulated electric wires 4 includes a conductor 5 having a linear shape, and an insulation 6 with which the conductor 5 is coated. The conductors 5 are made from a conductive material such as copper, and the insulations 6 are made from an insulating material such as polyvinyl chloride.

The conductors 5 are not coated with the insulations 6 and are exposed at end portions of the insulated electric wires 4 of the bunch of the electric wires 2. That is, the insulations 6 are provided on surfaces of the conductors 5 while not provided at the end portions of the conductors 5 such that the end portions are exposed.

In the present specification, a spot that corresponds to the exposed portions of the conductors 5 (the exposed conductors) of the insulated electric wires 4 of the bunch of the electric wires 2 is defined as an exposed bunched portion 7. A spot that corresponds to the portions, which are coated with the insulations 6, of the conductors 5 (the coated conductors) of the insulated electric wires 4 is defined as a coated bunched portion 8.

The exposed bunched portion 7 includes a splice 9 where the exposed end portions of the conductors 5 of the insulated electric wires 4 are connected to each other. The insulated electric wires 4 of the bunch of electric wires 2 are electrically connected to each other at the splice 9. The splice 9 is formed in a known connecting method such as crimping (melting and crimping) and welding.

The exposed conductors 5 of the insulated electric wires 4 are bunched at a spot excluding the splice 9 in the exposed bunched portion 7. Spaces exist among the bunched conductors 5.

Spaces exist among the insulated electric wires 4 in the coated bunched portion 8. These spaces are connected to the spaces among the conductors 5 in the exposed bunched portion 7.

In the method for producing the wiring harness of the present embodiment, a sealing member that is made from a resin is formed on the exposed bunched portion 7 and an end portion of the coated bunched portion 8 that is adjacent to the exposed bunched portion 7 in the bunch of electric wires 2. The sealing member of the present embodiment is arranged to seal both of the exposed bunched portion 7, and the end portion of the adjacent coated bunched portion 8.

Figure 2:
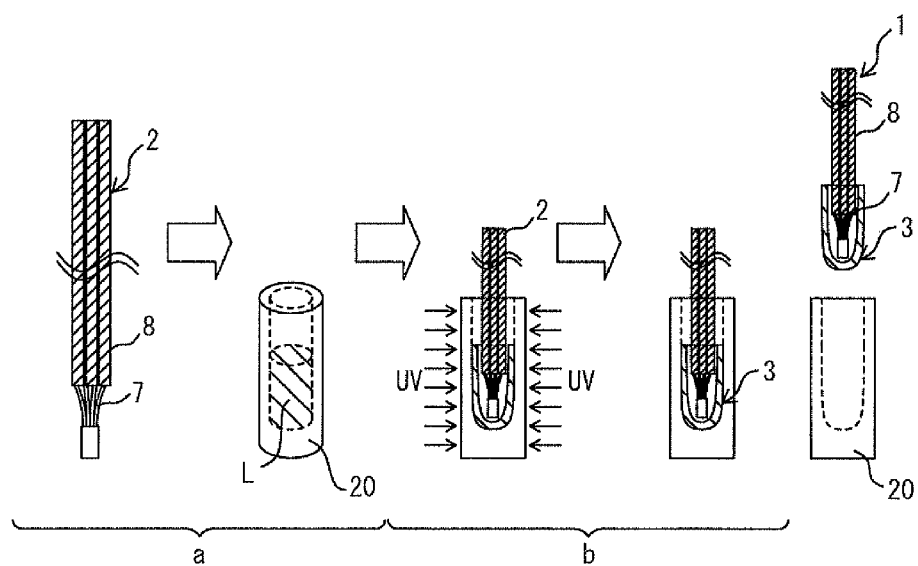
FIG. 2 is a view for schematically illustrating a method for producing a wiring harness of a first preferred embodiment of the present invention.

FIG. 2 is a view for schematically illustrating the method for producing the wiring harness of the present embodiment. The method for producing the wiring harness of the present embodiment includes a coat formation step (a), and a curing step (b) as shown in FIG. 2.

<Coat Formation Step>

The coat formation step includes providing a composition solution to an exposed bunched portion and a coated bunched portion that is adjacent to the exposed bunched portion of a bunch of electric wires, and forming a coat of the composition solution thereon.

The composition solution contains a photocuring resin solution containing a thermal radical polymerization initiator. Examples of the composition solution include a composition solution that contains at least a photo polymerization initiator, a thermal radical polymerization initiator, and a polymerizable compound.

Examples of the photo polymerization initiator include a benzophenone, a benzophenone derivative such as orthobenzoic acid methyl, and 4-benzoyl-4'-methyl diphenyl sulfide, thioxanthone, a derivative of thioxanthone, (2-methyl-1-[4-(methylthio)phenyl]-2-morpholino-propane-1-one), (2,4,6-trimethyl benzoil diphenyl phosphine oxide), a benzoin derivative, benzyl dimethyl ketal, α-hydroxyalkyl-phenone, α-aminoalkyl phenone, acylphosphine oxido, monoacylphosphine oxido, bisacylphosphine oxido, acrylic phenylglyoxylic acid, diethoxy acetophenone, and a titanocene compound. Selection of the photo polymerization initiator is made as appropriate in view of curing rate and yellowing property. The photo polymerization initiator may be used singly or in combination.

Examples of the combination of the photo polymerization initiators include LUCIRIN TPO (manuf.: BASF) and IRGACURE 184 (manuf.: CIBA SPECIALTY CHEMICALS INC.), LUCIRIN TPO (manuf.: BASF) and IRGACURE 651 (manuf.: Ciba Specialty Chemicals Inc.), LUCIRIN TPO (manuf.: BASF) and IRGACURE 907 (manuf.: CIBA SPECIALTY CHEMICALS INC.), and IRGACURE 184 (manuf.: CIBA SPECIALTY CHEMICALS INC.) and IRGACURE 907 (manuf.: CIBA SPECIALTY CHEMICALS INC.).

The content of the photo polymerization initiator in the composite solution is preferably within a range of 0.5 to 5% by mass. If the content is less than 0.5% by mass, even a spot that light sufficiently reaches could not be photocured sufficiently. On the other hand, if the content is more than 5% by mass, most of the photo polymerization initiator could remain unreacted. The remaining photo polymerization initiator could be activated by heat or light to change color of the sealing member after the cure to cause deterioration to the physical property of the sealing member such as an increase in Young's modulus and an decrease in elongation by reaction.

Examples of the thermal radical polymerization initiator include azobisisobutyronitrile (AIBN), and peroxides such as benzoyl peroxide (BM, lauroyl peroxide, acetyl peroxide, methyl ethyl ketone peroxide, cumene hydroperoxide, di-tert-butyl peroxide, tert-butyl perbenzoate, and cyclohexanone peroxide.

The content of the thermal radical polymerization initiator in the composite solution is preferably within a range of 0.5 to 5% by mass.

A combination of a chain acrylate monomer and either one or both of a cyclic acrylate monomer and a cyclic N-vinyl monomer is preferably used as the polymerizable compound in view of easy adjustment of resin viscosity, curing rate, degree of cure, Young's modulus, breaking elongation, and adhesion property. In particular, the polar monomers that have cyclic structures contribute to improvement in adhesion property of the resin to the base material after the cure.

A combination of a urethane acrylate oligomer and an acrylate monomer is preferably used as the acrylate compound.

Examples of the urethane acrylate oligomer include urethane acrylate obtained by reacting bisphenol A.ethyleneoxide adduct diol, tolylenediisocyanate, and hydroxyethyl acrylate, urethane acrylate obtained by reacting polytetramethylene glycol, tolylenediisocyanate, and hydroxyethyl acrylate, urethane acrylate obtained by reacting tolylenediisocyanate, and hydroxyethyl acrylate. The above-described oligomer may be used singly or in combination.

Examples of the acrylate monomer include a chain acrylate monomer and a cyclic acrylate monomer. The cyclic acrylate monomer defines an acrylate monomer having a cyclic structure such as an alicyclic ring and an aromatic ring. Examples of the cyclic acrylate monomer include iso-bornyl(meth) acrylate, bornyl (meth)acrylate, tricyclodecanyl(meth)acrylate, dicyclopentanyl(meth)acrylate, and tricyclodecanyl (meth)acrylate, and (meth)acrylate having an alicyclic structure such as dicyclopentanyl(meth)acrylate, benzyl (meth) acrylate, 4-butylcyclohexyl(meth)acrylate, and acryloyl morpholine. The iso-bornyl(meth)acrylate is preferably used as the cyclic acrylate monomer. IBXA (manuf.: OSAKA ORGANIC CHEMICAL INDUSTRY LTD.), and ARONIX M-111, M-113, M-114, M-117, TO-1210 (manuf.: TOAGOSEI CO., LTD.) are used as the cyclic acrylate monomer. In the present specification, the chain acrylate monomer defines a straight-chain or brunched chain acrylate monomer that does not have a cyclic structure. Examples of the chain acrylate monomer include neopentylglycol diacrylate, 3-methyl-1,5 pentanediol diacrylate, 1,6-hexanediol diacrylate, 2-butyl-2-ethyl-1,3-propanediol diacrylate, 2-4-diethyl-1,5-pentanediol diacrylate, 2-methyl-1,8-octanediol diacrylate, 1,9-nonanediol diacrylate, phenoxy hexaethylene glycol acetate, hydroxypivalic acid neopentylglycol acrylate, polyethylene glycol diacrylate, polypropylene glycol diacrylate, trimethyloipropane triacrylate, ethoxylated trimethyloipropane triacrylate, and dipentaerythritol hexaacrylate.

The acrylate compound may be used with a methacrylate compound. Examples of the methacrylate compound include di-2-methacryloxyethyl-phosphate, mono[2-(meth)acryloyloxyethyl]phosphate, mono[2-(meth)acryloyloxyethyl] diphenyl phosphate, mono[2-(meth)acryloyloxyethyl]phosphate, bis[2-(meth)acryloyloxypropyl]phosphate, tris[2-(meth)acryloyloxyethyl]phosphate, and a compound that is cited as o=P(—R1)(-R2)(-R3) in JP11-100414.

The cyclic N-vinyl monomer defines a vinyl monomer that has a cyclic structure such as an aromatic ring and an alicyclic ring, and contains nitrogen atoms. Examples of the cyclic N-vinyl monomer include N-vinyl pyrrolidone (manuf.: NIPPON SHOKUBAI CO., LTD.), N-vinylcaprolactam, vinylimidazole, and vinylpyridine.

The content of the polymerizable compound in the composition solution is determined as appropriate in view of viscosity of the composition solution.

It is preferable that the composition solution has a viscosity of 1000 mPa·s or less, preferably 500 mPa·s or less, and more preferably 100 mPa·s or less. If the viscosity of the composition solution is more than 1000 m·Ps, the composition solution sometimes has difficulty in coming in the spaces among the coated bunched portion and the spaces among the exposed bunched portion of the bunch of the electric wires.

The viscosity is measured in accordance with the JIS-K7117-1D. A B-type viscometer (under the condition of 25 degrees C.) is preferably used as a measurement device.

A contact angle of the composition solution is preferably 20 degrees or less, and more preferably 10 degrees or less.

The contact angle defines a contact angle to the base material made from the copper/PVC. The contact angle is measured in accordance with the JIS-K2396. FACE (CA-X) (Manuf.: KYOWA INTERFACE SCIENCE CO., LTD) is preferably used as a measurement device.

The Young's modulus of a cured object of the composition solution is preferably 10 MPa to 1000 MPa. When the Young's modulus is within this range, the sealing member has favorable damage resistance and handleability. The Young's modulus is more preferably 100 MPa to 500 MPa. When the Young's modulus is within this range, a harmonious balance can be maintained among resistance to pressure deformation, wear resistance and flexibility.

The cured object is a film object that is obtained by applying the composition solution on a PET film using an applicator bar having a thickness of 250 μm and irradiating the composition solution on the PET film with UV light of 1 J/cm² to cure with the use of a UV light irradiation device with a belt conveyer. The Young's modulus is measured in accordance with the JIS-K7133. A tensile strength tester (AGS) (Manuf.: SHIMAZU CORPORATION) is preferably used as a measurement device.

It is preferable that the cured object of the composition solution has an adhesion property of 100 N/m or more, and more preferably 200 N/m or more. In order to achieve such an adhesion property, polar monomers such as acrylate oligomer, a cyclic N-vinyl monomer, and the above-described cyclic acrylate monomer that have a polar radical are preferably contained in the composition solution.

In order to achieve a desirable adhesion property, it is preferable to add 0.5% by mass or more of a thiol compound, in particular a multifunctional thiol compound, in the composition solution. Examples of the thiol compound include KARENZ MT series: BD1, NR1, PE1 (Manuf.: SHOWA DENKO K.K.), thiol manufactured by SC ORGANIC CHEMICAL CO., LTD.: TMMP (trimethylolpropane tris), PEMP (pentaerythritol tetrakis), DPMP (dipentaerythritol hexakis), and TEMPIC (tris[(3-mercaptopropionyloxy)-ethyl]-isocyanurate). Multifunctional thiol of tri- or more functional thiol is preferably used for the thiol compound. Functioning to improve an adhesion property to the metal of the conductors, and also functioning as a curing accelerator in curing a polymerizable composition, the thiol compound can improve an adhesion property to a resin for coating electric wires such as PVC electric wires because the degree of cure of the cured resin is increased. A phosphoester compound or a chelate compound may be contained as an adherence auxiliary agent to improve the adhesion property to the metal of the conductors as appropriate within a range of not impairing the properties of the polymerizable compound.

The adhesion property of the cured object is obtained by forming a resin having a thickness of 500 μm and made from the composition solution on a base material made from copper/PVC, curing the resin to make a resin film, and subjecting the resin film to a peeling test at 90 degrees or a T-peeling test in accordance with the JIS-Z0237.

It is preferable that the cured object of the composition solution has a breaking elongation (%) of at least 50%, more preferably 100% or more.

The breaking elongation (W) of the cured material is measured in accordance with the JIS-K7113. A tensile strength tester (AGS) (Manuf.: SHIMAZU CORPORATION) is preferably used as a measurement device.

It is preferable that the composition solution contains an antioxidant, a coloring agent, an ultraviolet absorber, a light stabilizer, a silane or titanate coupling agent, a defoamer, a curing accelerator, an adherence auxiliary agent such as a thiol compound and a phosphoester compound, a leveling agent, a surface-active agent, a preservation stabilizing agent, a polymerization inhibitor, a plasticizer, a lubricant, a filler, an antiaging agent, a wetting characteristic improving agent, and a coating improving agent as additives as appropriate within a range of not impairing the properties of the sealing member.

In the present embodiment, provision of the composition solution is performed such that the bunch of electric wires 2 is placed in a composition solution L in a predetermined transparent container 20 (e.g., a polyvinyl chloride (PVC) cap) such that the exposed bunched portion 7 and the end portion of the adjacent coated bunched portion 8 are immersed in the composition solution as shown in FIG. 2.

In this manner, the coat of the composition solution is formed on the exposed bunched portion 7 and the end portion of the adjacent coated bunched portion 8. In other preferred embodiments, the coat may be formed with the use of a spray device.

<Curing Step>

The curing step defines a step of irradiating the coat with light, which is formed on the exposed bunched portion and the adjacent coated bunched portion of the bunch of electric wires, in order to subject the coat to thermal cure by heat of collected light in addition to photocure. The curing step of the present embodiment is characterized in that thermal cure of the resin composition disposed in a spot that light does not reach can proceed more effectively by providing curing heat that is generated in the photocure and heat of collected light that is obtained by leaving the work in a UV curing furnace to the coat immediately after the photocure. In addition, a curing state equal to the curing state obtained in the above curing step can be obtained by applying enough heat to cure the work after light irradiation with the use of a heater such as a hot-air device.

A light irradiation device (e.g., a collection UV light irradiation device), which is arranged to collect light emitted from a mercury lamp or a metal halide lamp with the use of a reflection mirror and provide heat of the collected light, can be used as means for irradiating light. It is also preferable to collect light with the use of irradiation means such as a UV spot light irradiation device to provide heat to an irradiation subject. The collection UV light irradiation device is preferably used considering that uniformity in cure can be obtained and deformation due to cure can be prevented. A collection UV light irradiation device with 80 W/cm or more lamp length is preferably used. It is preferable that a temperature of a collection portion of the collection UV light irradiation device is 100 degrees C. or more constantly.

Figure 3:
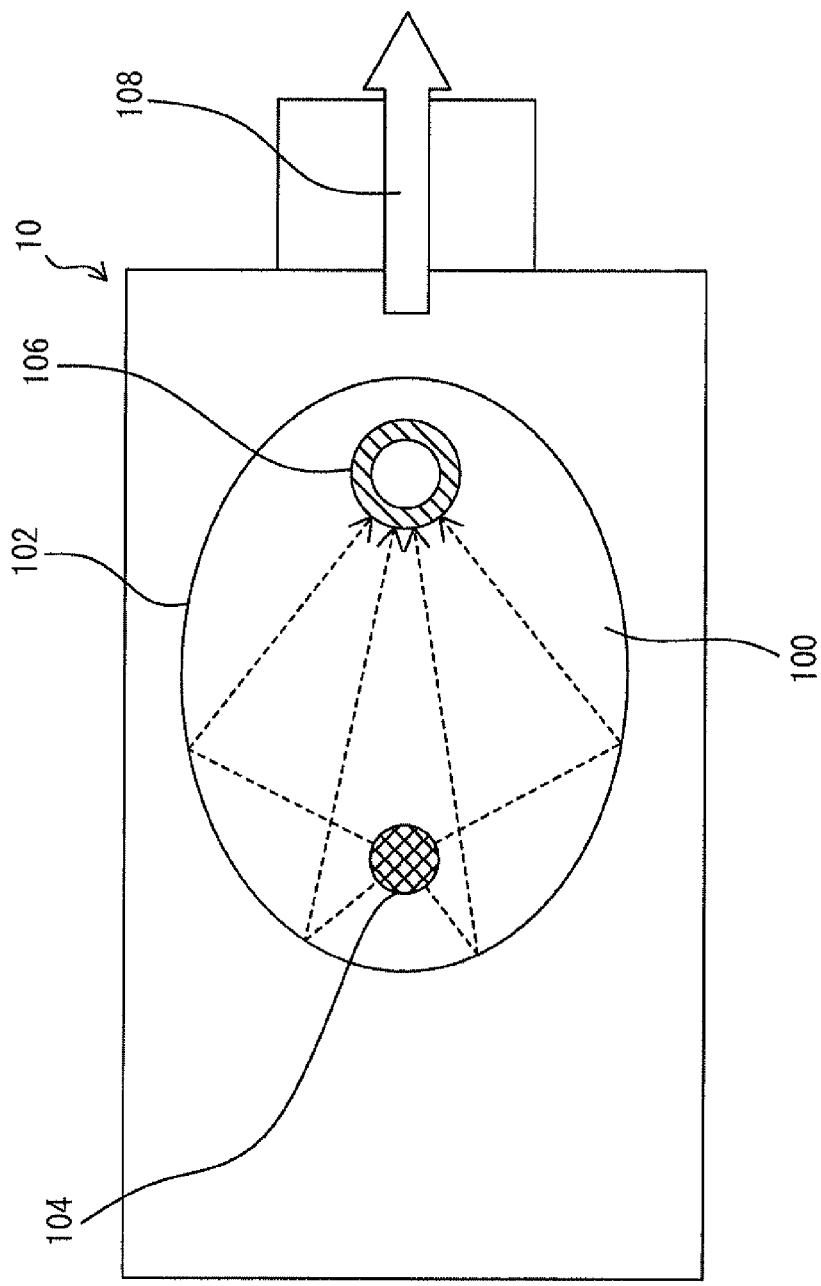
FIG. 3 is a view showing a schematic configuration of a light irradiation device.

FIG. 3 is a view showing a schematic configuration of a light irradiation device 10 used in the present embodiment. The light irradiation device 10 includes a light irradiation chamber 100 provided with a collection mirror 102 disposed along an oval side wall of the light irradiation chamber 100. A lamp (bulb) 104 is disposed at a focal point, and a quartz tube 106 in which a specimen is placed is disposed at the other focal point in the oval light irradiation chamber 100. A bunch of electric wires, on which a coat is formed, in a transparent container is placed in the quartz tube 106. That is, light is irradiated from the outside of the transparent container.

A composition solution (coat), which fills a spot that the light does not reach (does not reach easily) such as spaces among electric wires in a coated bunched portion and spaces among conductors in an exposed bunched portion, is thermally cured by heat of the collected light.

In the present embodiment, a few seconds of light irradiation duration is sufficient. The sealing member 3 is sufficiently cured in a few seconds.

It is preferable that the curing step is performed under an inert gas atmosphere. Examples of the inert gas include nitrogen and argon. The curing step performed under the inert gas atmosphere can prevent the curing from being inhibited by oxygen. The light irradiation device 10 shown in FIG. 3 has a configuration such that a nitrogen gas (108) circulates in the light irradiation chamber 100.

After the completion of the curing step, the bunch of electric wires 2 is separated from the transparent container 20 that covers the sealing member 3 of the bunch of electric wires 2 as shown in FIG. 2. In this manner, a wiring harness 1 is produced, of which a bunch of electric wires 2 is provided with a sealing member 3.

Figure 4:
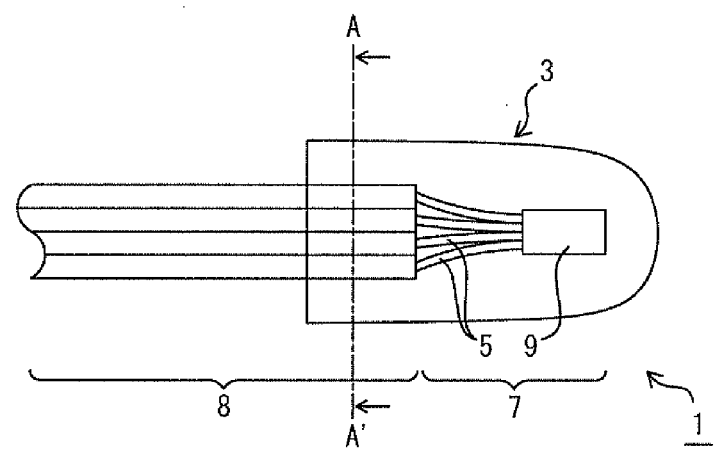
FIG. 4 a view showing a schematic configuration of the wiring harness of the embodiment.
Figure 5:
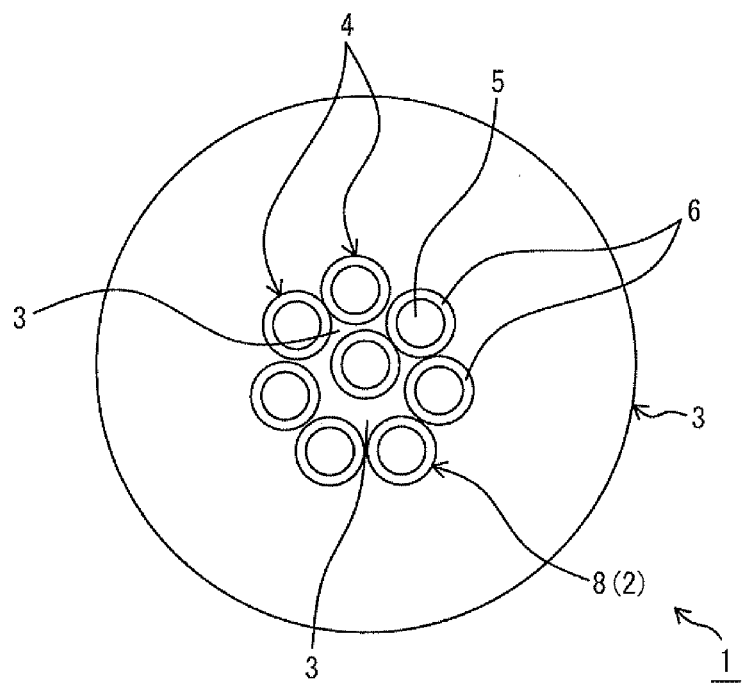
FIG. 5 is a cross-sectional view showing the same along the line A-A' of FIG. 4.

FIG. 4 is a view showing a schematic configuration of the wiring harness 1 that is produced in the method for producing the wiring harness of the present embodiment. FIG. 5 is a cross-sectional view showing the same along the line A-A' of FIG. 4.

The wiring harness 1 includes the bunch of electric wires 2 and the sealing member 3 as shown in FIG. 4.

The sealing member 3 consists of the resin that is cured by the photo polymerization, and the resin cured by thermal copolymerization. In the resins of which the sealing member 3 consists of, the spot that the light necessary for curing reaches from the outside is cured by the photo polymerization, and the spot that the light does not reach (does not reach easily) from the outside such as the spaces among the conductors 5 in the exposed bunched portion 7 and the spaces among the insulated electric wires 4 in the coated bunched portion 8 are cured by the thermal copolymerization.

It is to be noted that the sealing member 3 of the wiring harness has a small remaining stress (deformation) in the resin.

Next, a detailed description of a method for producing a wiring harness of another preferred embodiment of the present invention will be provided.

Second Preferred Embodiment

Figure 6:
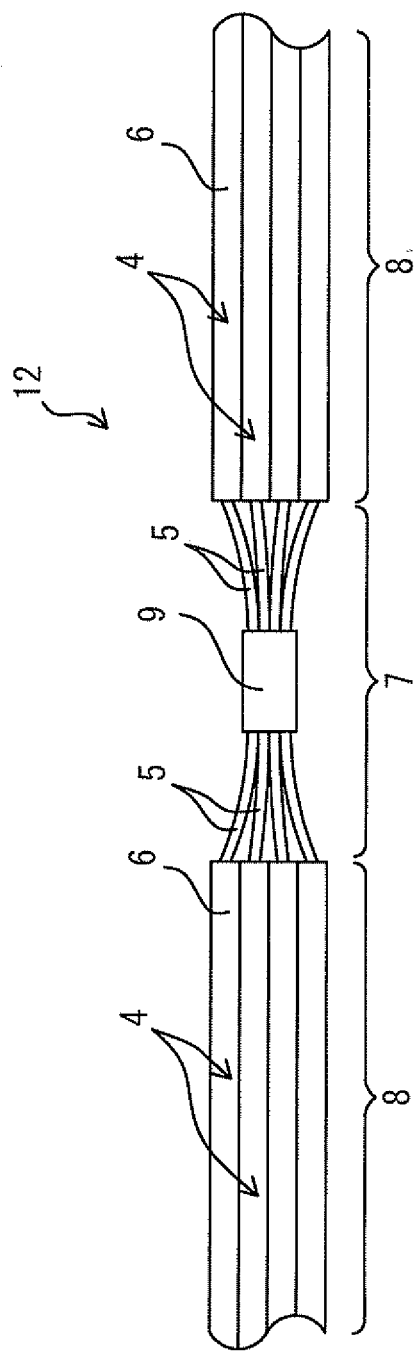
FIG. 6 is a view showing a schematic configuration of a bunch of electric wires including a splice at its intermediate portion.

The method for producing the wiring harness of the present embodiment differs in the shape of the bunch of electric wires 12 to which the sealing member 3 is provided. The bunch of electric wires 12 includes the splice 9 at its intermediate portion. FIG. 6 is a view showing a schematic configuration of the bunch of electric wires 12 including the splice 9 at its intermediate portion.

The conductors 5 are not coated with the insulations 6 and are exposed at the intermediate portions of the insulated electric wires 4 of the bunch of electric wires 12 as shown in FIG. 6. That is, the insulations 6 are formed on the conductors 5 such that the conductors 5 are exposed at their intermediate portions. The splice 9 is formed by connecting the conductors 5 at the exposed intermediate portions. The exposed bunched portion 7 is interposed by the two coated bunched portions 8 in the bunch of electric wires 12.

The exposed conductors 5 of the insulated electric wires 4 are bunched at a spot excluding the splice 9 in the exposed bunched portion 7. Spaces exist among the bunched conductors 5.

Spaces exist among the insulated electric wires 4 in the coated bunched portion 8. These spaces are connected to the spaces among the conductors 5 in the exposed bunched portion 7.

In the present embodiment, a sealing member is formed so as to coat the exposed bunched portion 7 and end portions of the two coated bunched portions 8 that are adjacent to the exposed bunched portion 7.

Figure 7:
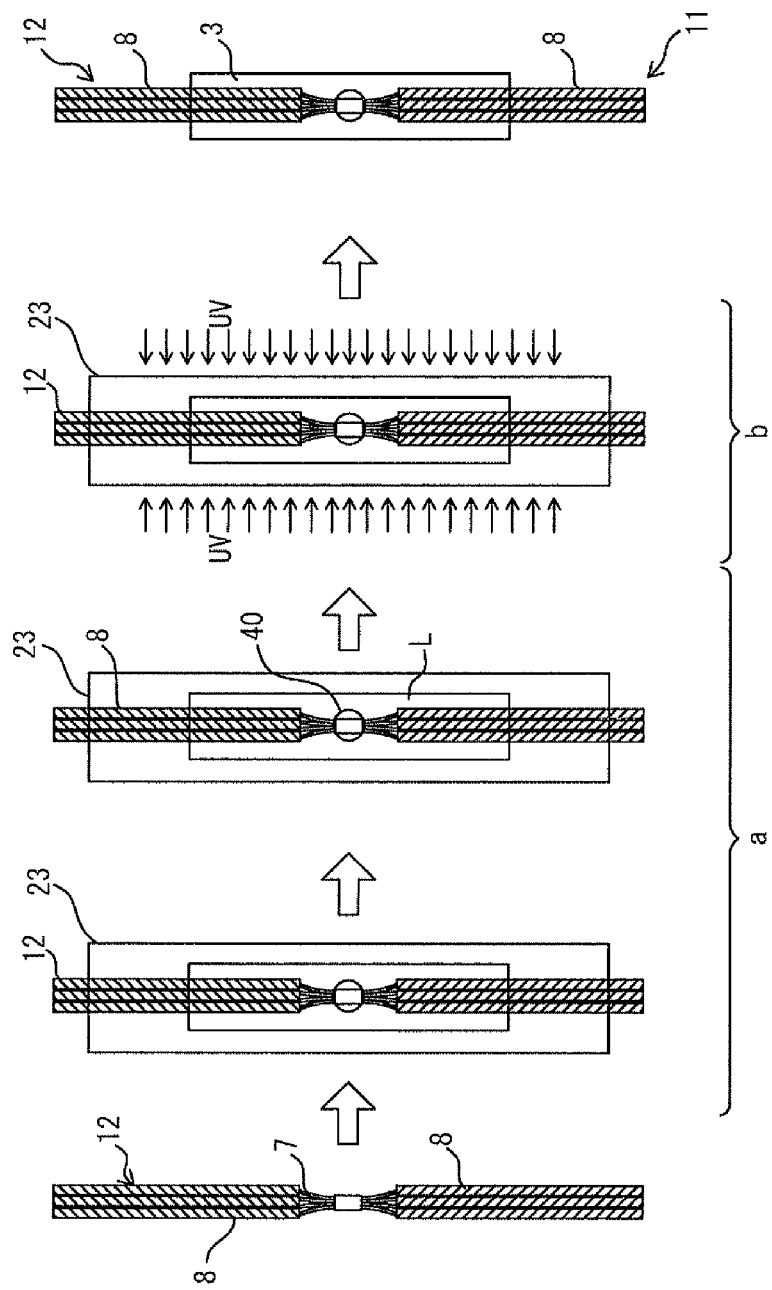
FIG. 7 is a view for schematically illustrating a method for producing a wiring harness of another preferred embodiment of the present invention.

FIG. 7 is a view for schematically illustrating the method for producing the wiring harness of the present embodiment. The method for producing the wiring harness of the present embodiment includes a coat formation step (a) and a curing step (b) similarly to the method for producing the wiring harness of the first embodiment. A composition solution same as the first embodiment is used in the present embodiment.

<Coat Formation Step>

In the coat formation step of the present embodiment, a mold (transparent mold) 23 made from a transparent material such as quartz is used to form the coat. The bunch of electric wires 12 is placed in the transparent mold 23 (in a cavity thereof) such that the exposed bunched portion 7 is disposed in the substantial center in the cavity of the transparent mold 23. After the exposed bunched portion 7 is disposed, the composition solution is poured in the cavity from an inlet 40 that communicates with the cavity. Then, the cavity is filled with the composition solution, and the exposed bunched portion 7 of the bunch of electric wires 12 is immersed in the composition solution. The size of the cavity is determined as appropriate according to the size of the sealing member to be formed on the bunch of electric wires 12. Thus, the coat is formed on the bunch of electric wires 12.

<Curing Step>

In the curing step of the present embodiment, the bunch of electric wires 12 on which the coat is formed is irradiated with light while left in the mold 23. The mold 23 is irradiated with light with the use of the light irradiation device 10 same as the one used in the first embodiment. Being irradiated with collected light for curing (e.g., ultraviolet light in the present embodiment) from the outside of the mold 23, the coat on the bunch of electric wires 12 is cured. In addition, the coat on the bunch of electric wires 12 is cured by heat of the collected light. It is preferable that the curing step is performed under an inert gas atmosphere.

After the completion of the curing step, the bunch of electric wires 12 is pulled out of the mold 23, and thus a wiring harness 11 is produced, of which the intermediate portion of the bunch of electric wires 12 is provided with the sealing member 3 as shown in FIG. 7.

Figure 8:
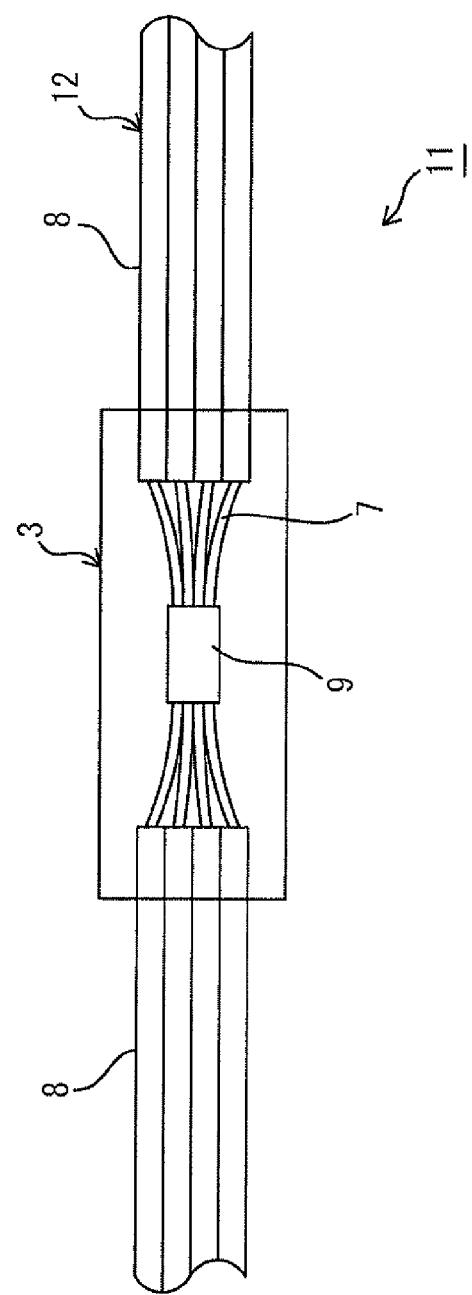
FIG. 8 is a view showing a schematic configuration of the wiring harness of the embodiment.

FIG. 8 is a view showing a schematic configuration of the wiring harness 11 that is produced in the method for producing the wiring harness of the present embodiment. In the wiring harness 11, the exposed bunched portion 7 that includes the splice 9 at the intermediate portion of the bunch of electric wires 12, and the end portions of the two coated bunched portions 8 that are adjacent to the exposed bunched portion 7 are coated with the sealing member 3 as shown in FIG. 8.

It is to be noted that the sealing member 3 of the wiring harness has a small remaining stress (deformation) in the resin.

EXAMPLE

A description of the present invention will now be specifically provided with reference to Examples. It is to be noted that the present invention is not limited to Examples.

Example 1

Preparation of Composition Solution

The composition solution was prepared by mixing the following compounds at the following ratios.

2,4,6-trimethyl benzoil diphenyl phosphine oxide (photo polymerization initiator) [manuf.: BASF, LUCIRIN TPO], 2 parts by mass Bis-(2,6-dimethoxybenzoyl)-2,4,4-trimethylpentylphosphine oxide (photo polymerization initiator) [manuf.: CIBA SPECIALTY CHEMICALS INC., IRGACURE 184], 1 part by mass Cumene hydroperoxide (thermal radical polymerization initiator) [manuf.: KAYAKUAKUZO CO., LTD., KAYAKUMEN], 1 part by mass Urethane acrylate oligomer (polymerizable compound) [manuf.: JSR CORPORATION], 40 parts by mass Acrylate monomer (chain polymerizable compound), 50 parts by mass Iso-bornyl acrylate monomer (cyclic polymerizable compound) [manuf.: TOAGOSEI CO., LTD., IBAX], 15 parts by mass Thiol compound (TMMP) [manuf.: SAKAI CHEMICAL INDUSTRY CO., LTD.] 1 part by mass Ethylenebis(oxyethylene)bis[3-(5-tert-butyl-4-hydroxy-1-m-tolyl)]propionate (antioxidant) [manuf.: CIBA SPECIALTY CHEMICALS INC., IRGANOX 245], 0.3 parts by mass The composition solution had a viscosity of 240 mPa·s at 25 degrees C.

<Bunch of Electric Wires Including a Splice at its End>

A bunch of electric wires including a splice at its end was prepared, the electric wires being made up of nine PVC electric wires each having an outer diameter of 1.8 mm (each conductor of the PVC electric wires had a diameter of 0.24 mm, and consisted of nineteen copper strands).

<Coat Formation Step>

1 ml of the composition solution was poured in a transparent container made from a PVC cap (a mold 8 mm in diameter). The bunch of electric wires was placed in the composition solution in the container from its exposed bunched portion such that 10 mm or more of the end portion of the coated bunched portion was immersed in the composition solution.

<Curing Step>

The bunch of electric wires while left in the composition solution was disposed on a collecting portion (focal area) in a light irradiation chamber of a light irradiation device (manuf. ORC MANUFACTURING CO., LTD., 800 W) as shown in FIG. 3. Irradiation with light (ultraviolet light) from a metal halide lamp of 800 W that defined a light source was performed for 60 seconds. It is to be noted that in a curing step of another work under the same condition, the temperature of a coat of a composition solution on a bunch of electric wires climbed to 140 degrees C. at a surface layer of the coat that was irradiated with ultraviolet light, and climbed to 105 degrees C. at a spot among the electric wires that the light did not reach easily during the irradiation with the ultraviolet light.

<Waterproof Performance Test>

Figure 9:
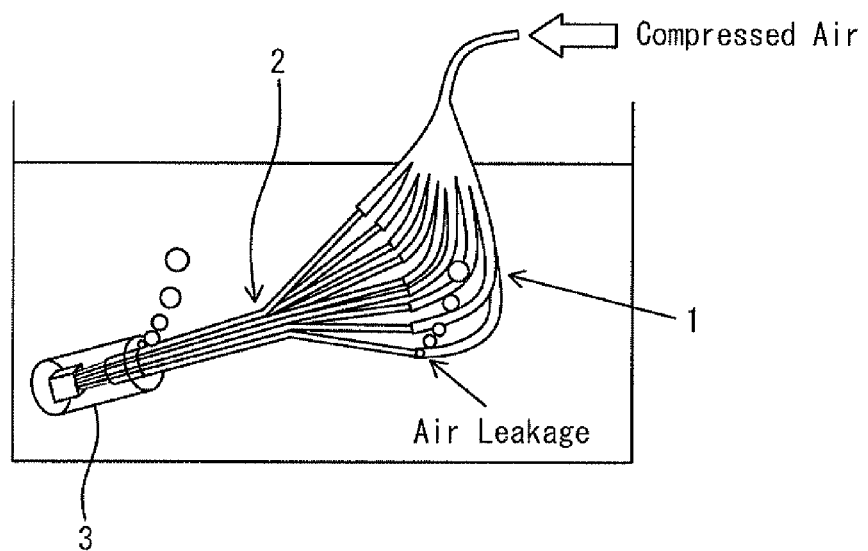
FIG. 9 is a view for illustrating a waterproof performance test for a wiring harness.

FIG. 9 is a view for illustrating a waterproof performance test for a wiring harness. The obtained wiring harness was placed in water such that an end portion with the sealing member of the wiring harness sank under water as shown in FIG. 9. Then, 200 kPa of compressed air was injected into each of the electric wires from the other end portion of the wiring harness. A check for air leakage from the sealing member and from the ends of the electric wires into which the compressed air was not injected and left free was made with eyes for one minute.

As a result, concerning the wiring harness of Example 1, air leakage from the sealing member (at a contact portion between the bunch of electric wires and the sealing member) and from the ends of the electric wires into which the compressed air was not injected and left free was not found.

<Measurement of Degree of Cure>

The degree of cure of the sealing member of the wiring harness of Example 1 was obtained with the use of FT-IR.

The degree of cure of the composition solution was obtained as follows.

In the composition yet to be cured, an absorption peak of methylene group at 2900 cm$^{-1}$, which does not change with the degree of cure, was set as a base peak, and the area of the base peak was set as an area Ac. Meanwhile, the area of a peak of acrylic group at 810 cm$^{-1}$, which changes with the degree of cure, was set as an area Aa. The area ratio of these areas in the composition solution that was yet to be cured was set as Aa/Ac=RL (0% degree of cure).

The area ratio of a cured film, which was prepared by irradiating a composition solution with UV light of 500 mJ/cm$^2$ (under a nitrogen atmosphere) so as to have a film thickness of 130 μm, was set as Aa/Ac=Rc (100% degree of cure).

A degree of cure Ds of a desired spot was obtained by the following equation as a ratio of two peak areas at this spot, Aa/Ac=Rs.

$Ds=\{(Rs-RL)/(RL-Rc)\} \times 100(\%)$

As a result, in the sealing member, the degree of cure of the spot that the UV light reached was 98%, and the degree of cure of the sealing member among the electric wires that defined the spot that the UV light did not reach was 93%.

In this manner, it was found that the degree of cure of the spot that the UV light did not reach was 90% or more, which was a high degree of cure.

Example 2

A wiring harness was produced by providing a sealing member to a bunch of electric wires including a splice at its end in the same manner as Example 1, except that a simple cap is used instead of using the PVC cap of Example 1, the simple cap being made by putting a rubber stopper of TEFLON (registered trademark) at one end of a 4 cm long transparent PVC tube that is 7 mm in inner diameter and 8 mm in outer diameter, and that the amount of a resin with which the cap is filled was 0.8 g. The electric wires of about 14 mm were immersed at the sealing member. After the completion of the curing step, the TEFLON (registered trademark) stopper at the one end could be easily stripped and removed therefrom, and thus the sealing member of cylindrical shape that was protected by the PVC tube and had an outer diameter close to that of the wiring harness could be formed. The waterproof performance and the degree of cure of the formed portion were almost equal to those of Example 1.

Example 3

A wiring harness was produced by providing a sealing member to a bunch of electric wires including a splice at its end in the same manner as Example 1, except that a composition solution that contained 15 parts by mass of N-vinyl pyrrolidone (manuf.: NIPPON SHOKUBAI CO., LTD.) was used instead of the cyclic polymerizable compound of Example 1. The waterproof performance and the degree of cure of the formed portion were almost equal to those of Example 1.

Example 4

A wiring harness was produced, of which a bunch of electric wires includes a splice at its end portion to which a sealing member is provided, in the same manner as Example 1, except that a transparent cap made from polyethylene was used instead of the PVC cap used in Example 1.

The transparent cap was separated from the sealing member by cutting and ripping the transparent cap after the curing step. Cutting and ripping the transparent cap allowed easy separation of the transparent polyethylene cap. There was no damage or deformation in the sealing member.

The wiring harness of Example 4 was subjected to the waterproof performance test similarly to Example 1. As a result, concerning the wiring harness of Example 4, air leakage from the sealing member (at a contact portion between the bunch of electric wires and the sealing member) was not found.

In addition, the wiring harness of Example 4 was subjected to the measurement of degree of cure similarly to Example 1. As a result, in the sealing member, the degree of cure of the spot that the UV light reached was 98%, and the degree of cure of the resin existing among the electric wires that defined the spot that the UV light did not reach was 92%.

Example 5

A wiring harness was produced by providing a sealing member to a bunch of electric wires including a splice at its end in the same manner as Example 1, except that a simple cap is used instead of using the PVC cap of Example 1, the simple cap being made by putting a rubber stopper of TEFLON (registered trademark) at one end of a transparent FEP tube (7 mm in inner diameter), and that a lamp manufactured by FUSION SYSTEM (D bulb) (Power setting: low (1.5 kW-equivalent output), UV irradiation duration: 20 seconds) was used as the UV lamp. It is to be noted that in a curing step of another work, the temperature of a resin climbed to 150 degrees C. at a surface layer, and climbed to 120 degrees C. at a spot among the electric wires during the irradiation with the ultraviolet light. The transparent FEP tube could be easily removed from its cut ripped portion, and the TEFLON (registered trademark) stopper could be easily removed by being taken out.

The wiring harness of Example 5 was subjected to the waterproof performance test similarly to Example 1. As a result, concerning the wiring harness of Example 5, air leakage from the sealing member (at a contact portion between the bunch of electric wires and the sealing member) was not found.

In addition, the wiring harness of Example 5 was subjected to the measurement of degree of cure similarly to Example 1. As a result, in the sealing member, the degree of cure of the spot that the UV light reached was 99%, and the degree of cure of the resin existing among the electric wires that defined the spot that the UV light did not reach easily was 94%.

Comparative Example 1

A wiring harness was produced by providing a sealing member to a bunch of electric wires including a splice at its end in the same manner as Example 1, except that 1 ml of a composition solution that contains no thermal radical polymerization initiator was used instead of the composition solution of Example 1.

The wiring harness of Comparative Example 1 was subjected to a waterproof performance test similar to Example 1. As a result, air leakage from insulated electric wires of the wiring harness (leakage between wires) and air leakage from a spot between PVC electric wires and the resin (sealing member leakage) occurred. The resin on the surface of the electric wires that light does not reach easily was little cured, and a viscous material was adhered thereto.

Then, the sealing member of the wiring harness in which the air leakage occurred was cut to observe its cross-section. As a result, it was found that spaces existed among the insulated electric wires in a coated bunched portion. It was found that the composition solution was uncured among the insulated electric wires in the electric wires of Comparative Example 1, so that the liquid uncured resin was extruded during the waterproof performance test to produce those spaces.

Example 6

A sealing member was produced that has a configuration same as that of Example 1, except that an N-vinyl monomer: N-vinyl pyrrolidone (manuf.: NIPPON SHOKUBAI CO., LTD.) was used instead of the iso-bornyl acrylate in the composition solution of Example 1. Concerning the obtained sealing member, 200 kPa of compressed air was applied for 1 minute from the end portion of the wiring harness in the same manner as Example 1, and air leakage from the other end portion of the wiring harness and air leakage from the sealing member were not found. In addition, the degree of cure of the resin existing among the electric wires that defined the spot that the UV light did not reach easily was 92%.

Example 7

Bunch of Electric Wires Including a Splice at its Intermediate Portion

Five PVC electric wires each having an outer diameter of 1.8 mm were prepared, and insulations at the intermediate portions of the electric wires were removed. Then, the exposed conductors were connected to each other by crimping to form a splice. Thus, the bunch of electric wires including the splice at its intermediate portion was prepared.

<Preparation of Composition Solution>

A composition solution having a composition same as Example 1 was used.

<Coat Formation Step>

The bunch of electric wires was placed in a mold (8 mm in diameter×40 mm long) made from quartz that was thinly coated with a fluorinated mold release agent such that an exposed bunched portion of the bunch of electric wires and end portions of two coated bunched portions that are adjacent to the exposed bunched portion fit into the mold. Then, the composition solution was poured in the mold. Fluorinated sealing rubber was inserted into both ends of the mold such that the resin did not come out from the spaces between the electric wires.

<Curing Step>

Then, the bunch of electric wires while left in the mold was disposed on a collecting portion (focal area) of a light irradiation device same as the one used in Example 1. The bunch of electric wires in the mold was left as it was to be irradiated for 60 seconds with ultraviolet light. Thus, the composition solution was cured.

Then, the bunch of electric wires was pulled out of the UV light irradiation device and separated from the mold. Thus, a wiring harness was obtained, which includes a sealing member that envelopes the exposed bunched portion and the end portions of the two coated bunched portions.

<Waterproof Performance Test>

The obtained wiring harness was placed in water such that the sealing member at the intermediate portion of the wiring harness sank under water. Then, 200 kPa of compressed air was injected into the electric wires from both ends of the wiring harness. A check for air leakage from the sealing member was made with eyes for 1 minute. As a result, concerning the wiring harness of Example 7, air leakage from the sealing member (at a contact portion between the bunch of electric wires and the sealing member) was not found.

<Measurement of Degree of Cure>

The degree of cure of the resin existing between the insulated wires 4 in the coated bunched portion 8, and the degree of cure of the resin existing between the conductors 5 in exposed bunched portion 7 of the wiring harness of Example 7 were obtained with the use of FT-IR similarly to Example 1. As a result, in the sealing member, the degree of cure of the spot that the UV light reached was 98%, and the degree of cure of the resin existing among the electric wires that defined the spot that the UV light did not reach was 93%.

The invention claimed is:

1. A method for producing a wiring harness, the wiring harness including:
   a bunch of electric wires including a plurality of insulated electric wires, each of which includes a conductor, and an insulation with which a portion of the conductor is coated while the other portion is exposed, the bunch of electric wires including:
   an exposed bunched portion having a splice, the exposed bunched portion defining a spot at which the exposed portions of the conductors of the insulated electric wires are bunched and connected to each other;
   a coated bunched portion defining a spot at which the coated portions of the conductors of the insulated electric wires are bunched; and
   a sealing member configured to seal the exposed bunched portion, and an end portion of the coated bunched portion that is adjacent to the exposed bunched portion, the method comprising:
      a coat formation step of forming a coat of a composition solution by coating the composition solution containing at least a photo polymerization initiator, a thermal radical polymerization initiator, and a polymerizable compound to the exposed bunched portion and the adjacent coated bunched portion; and
      a curing step of irradiating the coat formed on the exposed bunched portion and the adjacent coated bunched portion with light to photocure the coat and to thermally cure the coat by heat of the photocure and heat of collected light, the heat of collected light being at least 100° C. or more, wherein
      the polymerizable compound includes at least one of a urethane acrylate oligomer, a chain acrylate monomer, either one or both of a cyclic N-vinyl monomer and a cyclic acrylate monomer, and a thiol compound.

2. The method according to claim 1, wherein in the coat formation step, the composition solution is put in a transparent container, and the bunch of electric wires is placed in the composition solution in the transparent container from an upper surface of the composition solution until the exposed bunched portion and the end portion of the adjacent coated bunched portion are immersed in the composition solution to form the coat on the exposed bunched portion and the end portion of the adjacent coated bunched portion, and in the curing step, the coat is irradiated with the light from the outside of the transparent container.

3. The method according to claim 1, wherein in the coat formation step, the bunch of electric wires is placed in a transparent mold, and the composition solution is put in the mold to form the coat on the exposed bunched portion and the end portion of the adjacent coated bunched portion, and in the curing step, the coat is irradiated with the light from the outside of the mold.

4. A wiring harness comprising:
   a bunch of electric wires including a plurality of insulated electric wires, each of which includes a conductor and an insulation with which a portion of the conductor is coated while the other portion is exposed, the bunch of electric wires including:
   an exposed bunched portion having a splice, the exposed bunched portion defining a spot at which the exposed portions of the conductors of the insulated electric wires are bunched and connected to each other;
   a coated bunched portion defining a spot at which the coated portions of the conductors of the insulated electric wires are bunched; and
   a sealing member configured to seal the exposed bunched portion, and an end portion of the coated bunched portion that is adjacent to the exposed bunched portion, wherein:
   the sealing member includes a resin that is photocured and thermally cured, and a heat of collected light is at least 100° C. or more during thermal curing of the sealing member,
   the resin of the sealing member includes a cured object of a composition solution containing a photo polymerization initiator, a thermal radical polymerization initiator, and a polymerizable compound, and
   the polymerizable compound includes at least one of a urethane acrylate oligomer, a chain acrylate monomer, either one or both of a cyclic N-vinyl monomer and a cyclic acrylate monomer, and a thiol compound.

5. The method according to claim 1, wherein the thiol compound is a multifunctional thiol compound.

6. The method according to claim 2, wherein thermally curing of the coat is performed by a light irradiation device that includes:
   a light irradiation chamber formed of an oval side wall and a collection mirror disposed along the oval side wall;
   a lamp disposed at a first focal point in the light irradiation chamber, the transparent container being disposed at a second focal point of the light irradiation chamber.

7. The method according to claim 1, wherein the sealing member is exposed to an environment outside of the transparent container after the curing step.

8. The method according to claim 2, wherein the transparent container is removed after the curing step.

* * * * *